US012748691B2

(12) United States Patent
Zhou et al.

(10) Patent No.: US 12,748,691 B2
(45) Date of Patent: Sep. 29, 2026

(54) MEMORY DEVICE AND OPERATION THEREOF

(71) Applicant: YANGTZE MEMORY TECHNOLOGIES CO., LTD., Wuhan (CN)

(72) Inventors: Xufeng Zhou, Wuhan (CN); Zhipeng Dong, Wuhan (CN); Ke Ke, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 119 days.

(21) Appl. No.: 18/781,491

(22) Filed: Jul. 23, 2024

(65) Prior Publication Data

US 2026/0017187 A1 Jan. 15, 2026

(30) Foreign Application Priority Data

Jul. 12, 2024 (CN) ......................... 202410939662.9

(51) Int. Cl.
*G06F 12/02* (2006.01)

(52) U.S. Cl.
CPC ................................ *G06F 12/0246* (2013.01)

(58) Field of Classification Search
CPC .................................................. G06F 12/0246
See application file for complete search history.

(56) References Cited

U.S. PATENT DOCUMENTS

| | | | | |
|---|---|---|---|---|
| 6,438,037 B1 * | 8/2002 | Fastow | G11C 16/3404 | 365/185.22 |
| 7,170,796 B1 * | 1/2007 | He | G11C 16/3477 | 365/185.29 |
| 8,804,436 B1 * | 8/2014 | Chan | G11C 16/3431 | 365/185.28 |
| 2001/0043492 A1 * | 11/2001 | Lee | G11C 16/3468 | 365/185.29 |
| 2003/0161187 A1 * | 8/2003 | Lin | G11C 16/107 | 365/185.29 |
| 2006/0044919 A1 * | 3/2006 | Taoka | G11C 16/107 | 365/230.03 |
| 2017/0047123 A1 * | 2/2017 | Yano | G11C 16/3445 | |
| 2018/0082753 A1 * | 3/2018 | Maejima | G11C 16/26 | |
| 2020/0043556 A1 * | 2/2020 | Moon | G06F 3/0652 | |
| 2024/0361945 A1 * | 10/2024 | Xu | G06F 3/0652 | |

* cited by examiner

*Primary Examiner* — Jay W. Radke
(74) *Attorney, Agent, or Firm* — BAYES PLLC

(57) ABSTRACT

In certain aspects, a memory device includes a block of memory cells, and a peripheral circuit coupled to the block of memory cells. The peripheral circuit is configured to, in an erase operation, pre-erase the block of memory cells, program the block of memory cells after pre-erasing the block of memory cells, and erase the block of memory cells after programming the block of memory cells.

20 Claims, 11 Drawing Sheets

500

MEMORY DEVICE AND OPERATION THEREOF

CROSS-REFERENCE TO RELATED APPLICATIONS

This application claims the benefit of priority to Chinese Application No. 202410939662.9, filed on Jul. 12, 2024, which is incorporated herein by reference in its entirety.

BACKGROUND

The present disclosure relates to memory devices and operation methods thereof.

Flash memory is a low-cost, high-density, non-volatile solid-state storage medium that can be electrically erased and re-programmed. Flash memory includes NOR Flash memory and NAND Flash memory. Various operations can be performed by Flash memory, such as read, program (write), and erase. For NAND Flash memory, an erase operation can be performed at the block level, and a program operation or a read operation can be performed at the page level.

SUMMARY

In one aspect, a memory device includes a block of memory cells, and a peripheral circuit coupled to the block of memory cells. The peripheral circuit is configured to, in an erase operation, pre-erase the block of memory cells, program the block of memory cells after pre-erasing the block of memory cells, and erase the block of memory cells after programming the block of memory cells.

In some implementations, the peripheral circuit is configured not to verify the block of memory cells after pre-erasing and before erasing the block of memory cells.

In some implementations, the peripheral circuit is configured to program the block of memory cells immediately after pre-erasing the block of memory cells, and erase the block of memory cells immediately after programming the block of memory cells.

In some implementations, the peripheral circuit is further configured to verify the block of memory cells after erasing the block of memory cells.

In some implementations, the peripheral circuit is further configured to, in response to the block of memory cells after erasing failing to be verified, erase the block of memory cells again.

In some implementations, the memory device further includes word lines respectively coupled to rows of the block of memory cells. In some implementations, to pre-erase the block of memory cells, the peripheral circuit is configured to apply a supply voltage that is not greater than 1 volt to each of the word lines. In some implementations, to erase the block of memory cells, the peripheral circuit is configured to apply the supply voltage to each of the word lines.

In some implementations, to program the block of memory cells, the peripheral circuit is configured to apply a program voltage to each of the word lines.

In some implementations, the memory device is a NAND Flash memory device.

In another aspect, a method for operating a memory device is provided. The memory device includes a block of memory cells. In an erase operation, the block of memory cells are pre-erased, the block of memory cells are programmed after pre-erasing the block of memory cells, and the block of memory cells are erased after programming the block of memory cells.

In some implementations, the block of memory cells are not verified after pre-erasing and before erasing the block of memory cells.

In some implementations, the block of memory cells are programmed immediately after pre-erasing the block of memory cells, and the block of memory cells are erased immediately after programming the block of memory cells.

In some implementations, the block of memory cells are verified after erasing the block of memory cells.

In some implementations, in response to the block of memory cells after erasing failing to be verified, the block of memory cells are erased again.

In some implementations, the memory device further includes word lines respectively coupled to rows of the block of memory cells. In some implementations, to pre-erase the block of memory cells, a supply voltage that is not greater than 1 volt is applied to each of the word lines. In some implementations, to erase the block of memory cells, the supply voltage is applied to each of the word lines.

In some implementations, to program the block of memory cells, a program voltage is applied to each of the word lines.

In some implementations, the memory device is a NAND Flash memory device.

In still another aspect, a system includes a memory device configured to store data and a memory controller coupled to the memory device and configured to control the memory device. The memory device includes a block of memory cells, and a peripheral circuit coupled to the block of memory cells. The peripheral circuit is configured to, in an erase operation, pre-erase the block of memory cells, program the block of memory cells after pre-erasing the block of memory cells, and erase the block of memory cells after programming the block of memory cells.

In some implementations, the memory controller is configured to send an erase command to the peripheral circuit of the memory device. In some implementations, the peripheral circuit is configured to pre-erase, program, and erase the block of memory cells in response to receiving the erase command.

In some implementations, the peripheral circuit is configured not to verify the block of memory cells after pre-erasing and before erasing the block of memory cells.

In some implementations, the peripheral circuit is configured to program the block of memory cells immediately after pre-erasing the block of memory cells, and erase the block of memory cells immediately after programming the block of memory cells.

In some implementations, the peripheral circuit is further configured to verify the block of memory cells after erasing the block of memory cells.

In some implementations, the peripheral circuit is further configured to, in response to the block of memory cells after erasing failing to be verified, erase the block of memory cells again.

In some implementations, the memory device further includes word lines respectively coupled to rows of the block of memory cells. In some implementations, to pre-erase the block of memory cells, the peripheral circuit is configured to apply a supply voltage that is not greater than 1 volt to each of the word lines. In some implementations, to erase the block of memory cells, the peripheral circuit is configured to apply the supply voltage to each of the word lines.

In some implementations, to program the block of memory cells, the peripheral circuit is configured to apply a program voltage to each of the word lines.

In some implementations, the memory device is a NAND Flash memory device.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

The present disclosure will be described with reference to the accompanying drawings.

DETAILED DESCRIPTION

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Some memory devices, such as NAND Flash memory devices, erase data at the level of entire blocks each including multiple pages. When a block is erased, all the memory cells in the block are set to the erased state (E0), for example, at logical 1. After erase operations, quite some shallow holes (e.g., holes at relatively low energy levels) may be accumulated in the storage layer (e.g., charge trap layer of NAND Flash memory devices), which can escape and/or be recombined with electronics, thereby affecting memory cells set at the erased state, for example, shifting their threshold voltages at the erase state (a.k.a., E0 loss).

To address one or more of the aforementioned issues, the present disclosure introduces a pre-erase scheme for erase operations that pre-erase the block of memory cells at the beginning of an erase operation, which can improve the threshold voltage distributions of memory cells at the erased state after the erase operation. The memory cells in the block can be slightly erased to the erased state by the pre-erase scheme before regular erase. As a result, the number of shallow holes after the regular erase can be significantly reduced due to the pre-erase in advance, which can reduce E0 loss while maintaining the read window margin at the erased state.

Figure 1:
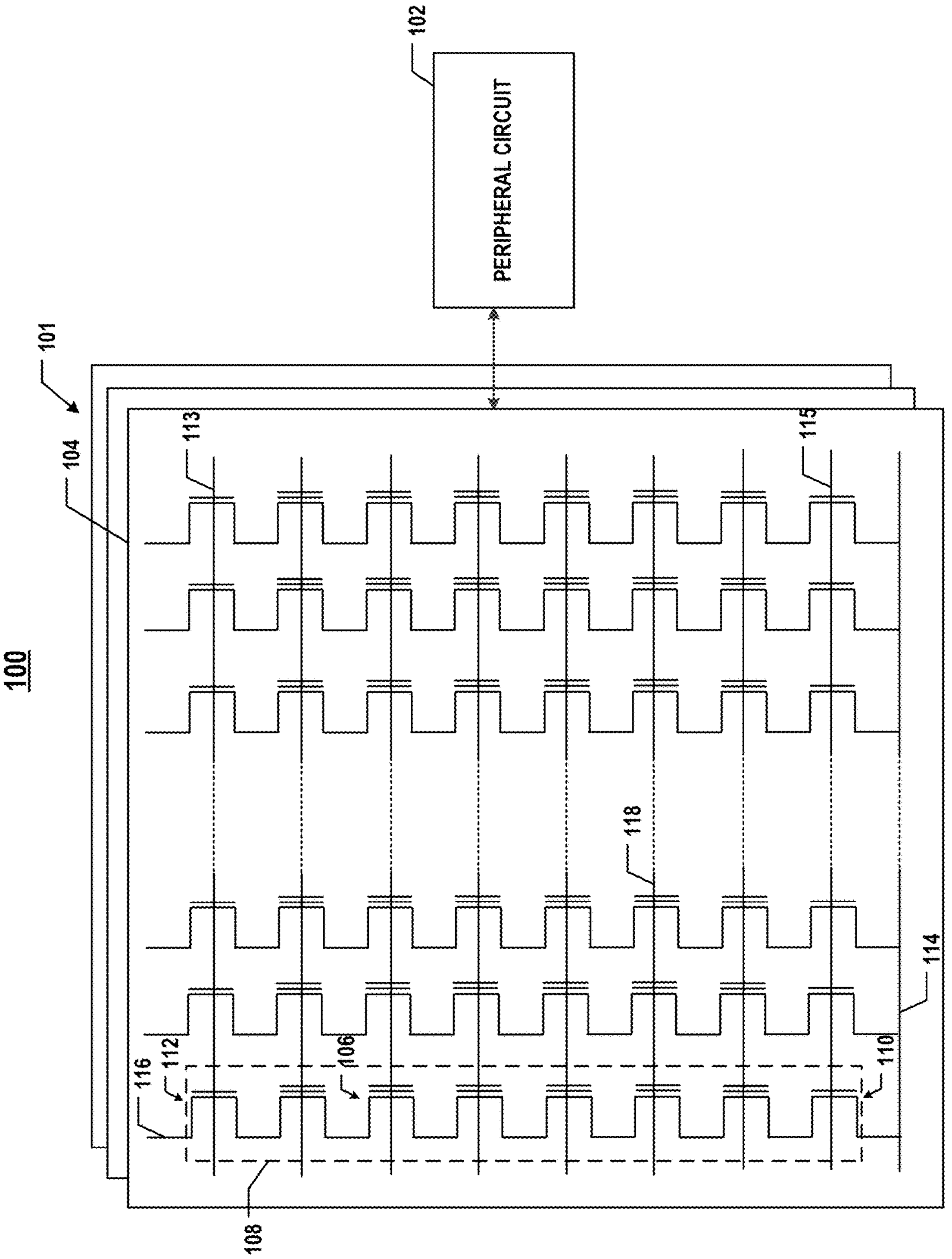
FIG. 1 illustrates a schematic diagram of a memory device including peripheral circuits, according to some aspects of the present disclosure.

FIG. 1 illustrates a schematic circuit diagram of a memory device 100 including peripheral circuits, according to some aspects of the present disclosure. Memory device 100 can include a memory cell array 101 and peripheral circuits 102 coupled to memory cell array 101. Memory cell array 101 can be a NAND Flash memory cell array in which memory cells 106 are provided in the form of an array of NAND memory strings 108 each extending vertically above a substrate (not shown). In some implementations, each NAND memory string 108 includes a plurality of memory cells 106 coupled in series and stacked vertically. Each memory cell 106 can hold a continuous, analog value, such as an electrical voltage or charge, which depends on the number of electrons trapped within a region of memory cell 106. Each memory cell 106 can be either a floating gate type of memory cell including a floating-gate transistor or a charge trap type of memory cell including a charge-trap transistor.

In some implementations, each memory cell 106 is an SLC that has two possible levels (memory states) and thus, can store one bit of data. For example, the first state "0" can correspond to a first range of threshold voltages, and the second state "1" can correspond to a second range of threshold voltages. In some implementations, each memory cell 106 is an xLC that is capable of storing more than a single bit of data in more than four levels. For example, the xLC may store two bits per cell (MLC), three bits per cell (TLC), or four bits per cell (QLC)). Each xLC can be programmed to assume a range of possible nominal storage values (i.e., corresponding to $2^N$ pieces of N-bits data). In some implementations, each memory cell 106 is set to one of $2^N$ final levels corresponding to a piece of N-bits data, where Nis an integer greater than 2.

As shown in FIG. 1, each NAND memory string 108 can also include a source select gate (SSG) transistor 110 at its source end and a drain select gate (DSG) transistor 112 at its drain end. SSG transistor 110 and DSG transistor 112 can be configured to activate select NAND memory strings 108 (columns of the array) during read and program operations. In some implementations, the sources of NAND memory strings 108 in the same block 104 are coupled through a same source line (SL) 114, e.g., a common SL. In other words, all NAND memory strings 108 in the same block 104 have an array common source (ACS), according to some implementations. The drain of each NAND memory string 108 is coupled to a respective bit line 116 from which data can be read or written via an output bus (not shown), according to some implementations. In some implementations, each NAND memory string 108 is configured to be selected or deselected by applying a select voltage or a deselect voltage to the gate of respective DSG transistor 112 through one or more DSG lines 113 and/or by applying a select voltage or a deselect voltage to the gate of respective SSG transistor 110 through one or more SSG lines 115.

As shown in FIG. 1, NAND memory strings 108 can be organized into multiple blocks 104, each of which can have a common source line 114, e.g., coupled to the ACS. In some implementations, each block 104 is the basic data unit for erase operations, i.e., all memory cells 106 on the same block 104 are erased at the same time. To erase memory cells 106 in a select block 104, source lines 114 coupled to select block 104 as well as unselect blocks 104 in the same plane as select block 104 can be biased with an erase voltage (Vera), such as a high positive bias voltage (e.g., 20 V or more). Memory cells 106 of adjacent NAND memory strings 108 can be coupled through word lines 118 that select which row of memory cells 106 is affected by read and program operations. In some implementations, each word line 118 is coupled to a plurality of memory cells 106. Each word line 118 can include a plurality of control gates (gate electrodes) at each memory cell 106 and a gate line coupling the control gates.

As shown in FIG. 1, memory cell array 101 can include an array of memory cells 106 in a plurality of rows and a plurality of columns in each block 104. One column of memory cells corresponds to one NAND memory string 108, according to some implementations. The plurality of rows of memory cells 106 can be respectively coupled to word lines 118, and the plurality of columns of memory cells 106 can be respectively coupled to bit lines 116. Peripheral circuit 102 can be coupled to memory cell array 101 through bit lines 116 and word lines 118.

Figure 2:
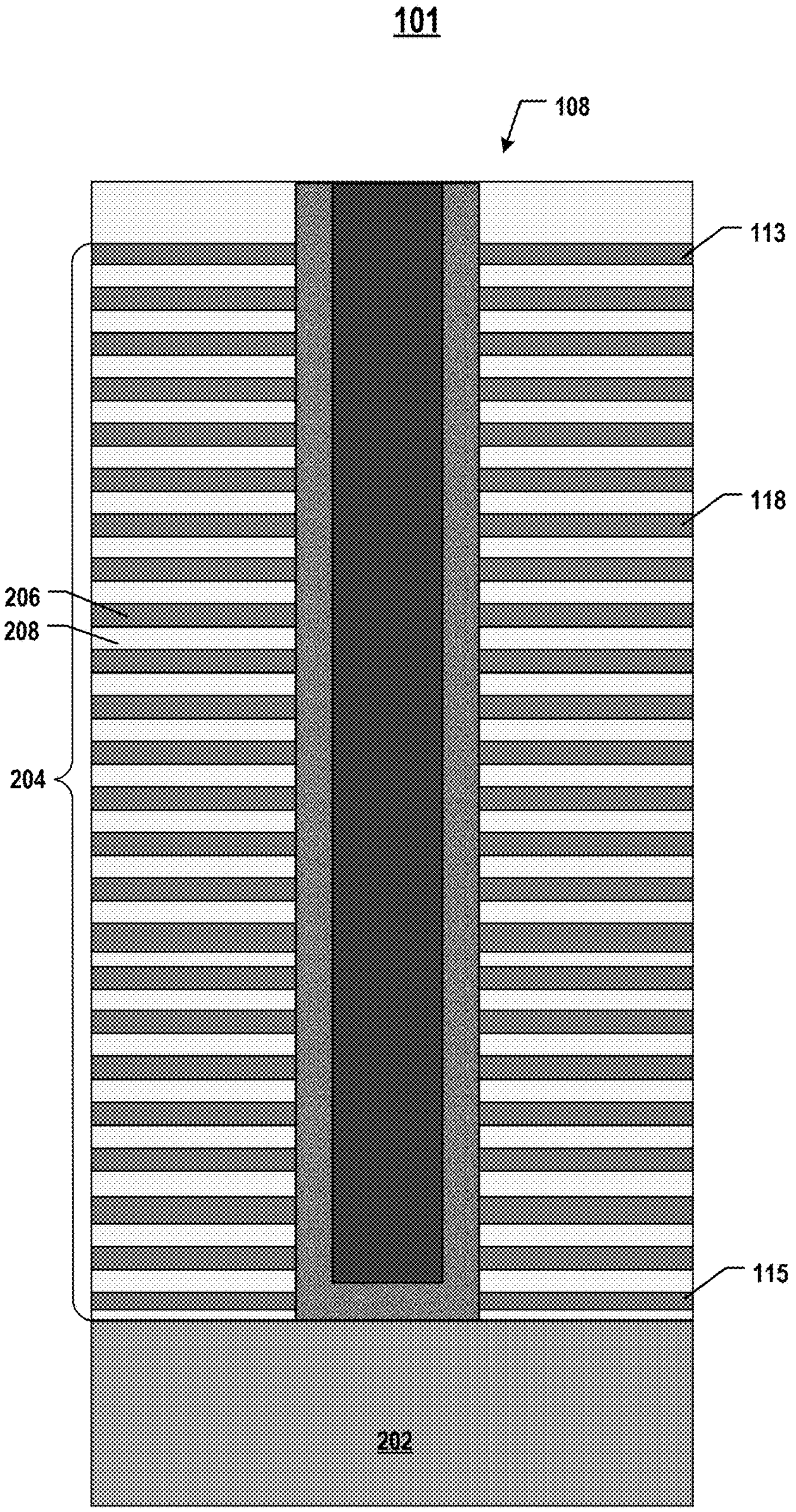
FIG. 2 illustrates a side view of a cross-section of a memory cell array including a NAND memory string, according to some aspects of the present disclosure.

FIG. 2 illustrates a side view of a cross-section of memory cell array 101 including NAND memory string 108, according to some aspects of the present disclosure. As shown in FIG. 2, NAND memory string 108 can extend vertically through a memory stack 204 above a substrate 202. Substrate 202 can include silicon (e.g., single crystalline silicon), silicon germanium (SiGe), gallium arsenide (GaAs), germanium (Ge), silicon on insulator (SOI), germanium on insulator (GOI), or any other suitable materials.

Memory stack 204 can include interleaved gate conductive layers 206 and gate-to-gate dielectric layers 208. The number of the pairs of gate conductive layers 206 and gate-to-gate dielectric layers 208 in memory stack 204 can determine the number of memory cells 106 in memory cell array 101. Gate conductive layer 206 can include conductive materials including, but not limited to, tungsten (W), cobalt (Co), copper (Cu), aluminum (Al), polysilicon, doped silicon, silicides, or any combination thereof. In some implementations, each gate conductive layer 206 includes a metal layer, such as a tungsten layer. In some implementations, each gate conductive layer 206 includes a doped polysilicon layer. Each gate conductive layer 206 can include control gates surrounding memory cells 106, the gates of DSG transistors 112, or the gates of SSG transistors 110, and can extend laterally as DSG line 113 at the top of memory stack 204, SSG line 115 at the bottom of memory stack 204, or word line 118 between DSG line 113 and SSG line 115.

As shown in FIG. 2, NAND memory string 108 includes a channel structure extending vertically through memory stack 204. In some implementations, the channel structure includes a channel hole filled with semiconductor material(s) (e.g., as a semiconductor channel) and dielectric material(s) (e.g., as a memory film). In some implementations, the semiconductor channel includes silicon, such as polysilicon. In some implementations, the memory film is a composite dielectric layer including a tunneling layer, a storage layer (e.g., a charge trap layer), and a blocking layer. Carriers (holes and electronics) can be moved into and out of the storage layer using different voltage patterns in different operations. The tunneling layer can include silicon oxide, silicon oxynitride, or any combination thereof. The storage layer can include silicon nitride, silicon oxynitride, silicon, or any combination thereof. The blocking layer can include silicon oxide, silicon oxynitride, high-k dielectrics, or any combination thereof. In one example, the memory film may include a composite layer of silicon oxide/silicon oxynitride/silicon oxide (ONO). It is understood that although not shown in FIG. 2, additional components of memory cell array 101 can be formed including, but not limited to, gate line slits/source contacts, local contacts, interconnect layers, etc.

Figure 3:
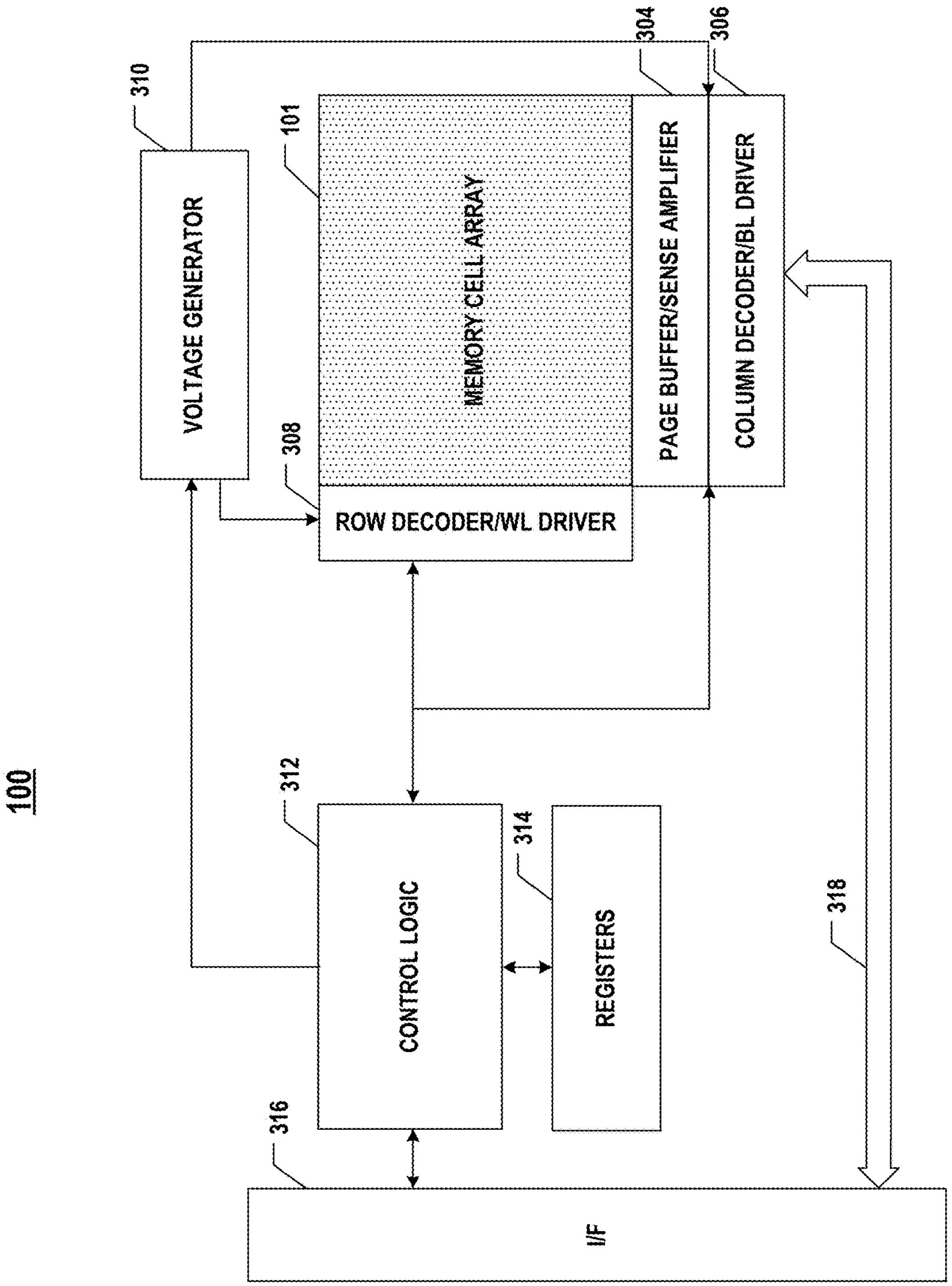
FIG. 3 illustrates a block diagram of a memory device including a memory cell array and peripheral circuits, according to some aspects of the present disclosure.

Referring back to FIG. 1, peripheral circuits 102 can be coupled to memory cell array 101 through bit lines 116, word lines 118, source lines 114, SSG lines 115, and DSG lines 113. Peripheral circuits 102 can include any suitable analog, digital, and mixed-signal circuits for facilitating the operations of memory cell array 101 by applying and sensing voltage signals and/or current signals to and from each select memory cell 106 through bit lines 116, word lines 118, source lines 114, SSG lines 115, and DSG lines 113. Peripheral circuits 102 can include various types of peripheral circuits formed using metal-oxide-semiconductor (MOS) technologies. For example, FIG. 3 illustrates some exemplary peripheral circuits including a page buffer/sense amplifier 304, a column decoder/bit line driver 306, a row decoder/word line driver 308, a voltage generator 310, control logic 312, registers 314, an interface (I/F) 316, and a data bus 318. It is understood that in some examples, additional peripheral circuits not shown in FIG. 3 may be included as well.

Page buffer/sense amplifier 304 can be configured to sense (read) and program (write) data from and to memory cell array 101 according to the control signals from control logic 312. In one example, page buffer/sense amplifier 304 may store one or more pages of program data (write data, referred to herein as "data page") to be programmed into memory cell array 101. In another example, page buffer/sense amplifier 304 may verify programmed select memory cells 106 in each program/verify cycle in a program operation to ensure that the data has been properly programmed into memory cells 106 coupled to select word lines 118. In still another example, page buffer/sense amplifier 304 may also sense the low power signals from bit line 116 that represents a data bit stored in memory cell 106 and amplify the small voltage swing to recognizable logic levels in a read operation.

Column decoder/bit line driver 306 can be configured to be controlled by control logic 312 and select one or more NAND memory strings 108 by applying bit line voltages generated from voltage generator 310. Row decoder/word line driver 308 can be configured to be controlled by control logic 312 and select/deselect blocks 104 of memory cell array 101 and select/deselect word lines 118 of block 104. Row decoder/word line driver 308 can be further configured to drive word lines 118 using word line voltages generated from voltage generator 310. In some implementations, row decoder/word line driver 308 can also select/deselect and drive SSG lines 115 and DSG lines 113 as well. Voltage generator 310 can be configured to be controlled by control logic 312 and generate the word line voltages (e.g., read voltage, program voltage, channel pass voltage, supply voltage, verify voltage, etc.), bit line voltages, and source line voltages to be supplied to memory cell array 101.

Control logic 312 can be coupled to each peripheral circuit described above and configured to control the operations of each peripheral circuit. Registers 314 can be coupled to control logic 312 and include status registers, command registers, and address registers for storing status information, command operation codes (OP codes), and command addresses for controlling the operations of each peripheral circuit. Interface 316 can be coupled to control logic 312 and act as a control buffer to buffer and relay control commands received from a memory controller (not shown) and/or a host (not shown) to control logic 312 and status information received from control logic 312 to the memory controller and/or the host. Interface 316 can also be coupled to column decoder/bit line driver 306 via data bus 318 and act as a data input/output (I/O) interface and a data buffer to buffer and relay the data to and from memory cell array 101.

Figure 4:
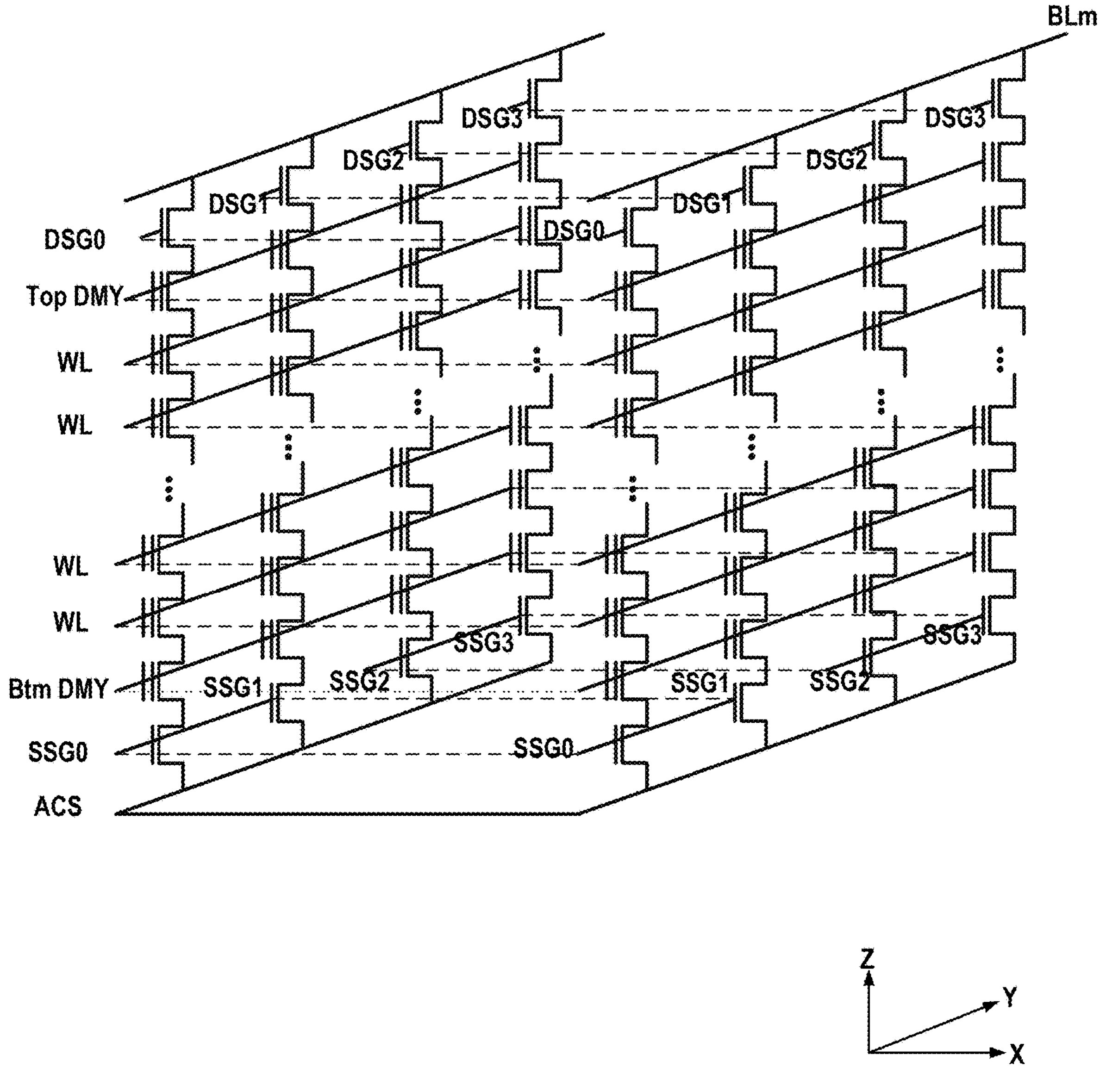
FIG. 4 illustrates a schematic diagram of 3D NAND memory strings, according to some aspects of the present disclosure.

FIG. 4 illustrates a schematic diagram of 3D NAND memory strings, according to some aspects of the present disclosure. FIG. 4 shows an example of an array of 3D NAND memory strings (e.g., 108 in FIG. 1) in a block (e.g., 104 in FIG. 1). As shown in FIG. 4, from top to bottom in the z-direction, each 3D NAND memory string may be coupled to a number of lines in different rows, e.g., bit lines (BLs, e.g., 116 in FIG. 1), DSG lines (DSGs, e.g., 113 in FIG. 1), dummy DSG lines (top DMYs), word lines (WLs, e.g., 118 in FIG. 1), dummy SSG lines (bottom DMYs), SSG line (SSG, e.g., 115 in FIG. 1), and array common source line (ACS, e.g., 114 in FIG. 1). As shown in FIG. 4, in both the word line direction (the x-direction) and the bit line direction (the y-direction), the word lines may extend laterally to connect the memory cells of the 3D NAND memory strings. As to the DSG lines and SSG lines, the DSG lines and SSG lines may be continuous in the word line direction (the x-direction) to connect the DSG transistors and SSG transistors of the 3D NAND memory strings at the same position in the y-direction (e.g., DSG0 and DSG0, SSG0 and SSG0). As shown in FIG. 4, in the same block, all 3D NAND memory strings may be coupled to the same ACS, and all the memory cells may be erased together to the erased state (E0) in an erase operation.

Figure 5A:
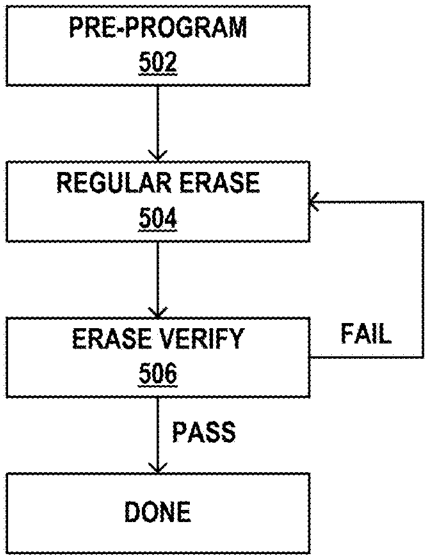
FIG. 5A illustrates a flow chart of an erase operation.
Figure 5B:
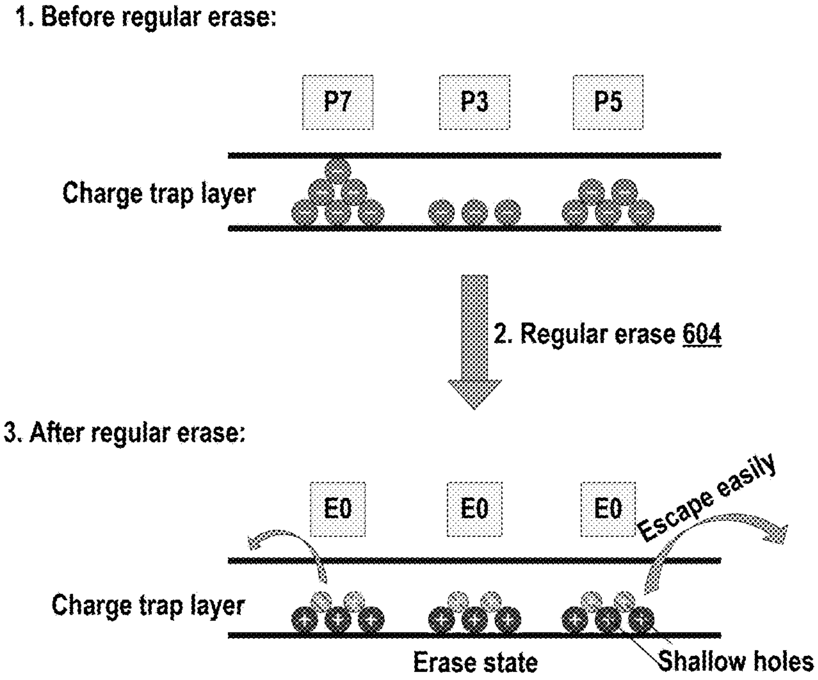
FIG. 5B illustrates the behavior of carriers in a charge trap layer during the erase operation shown in FIG. 5A.
Figure 5C:
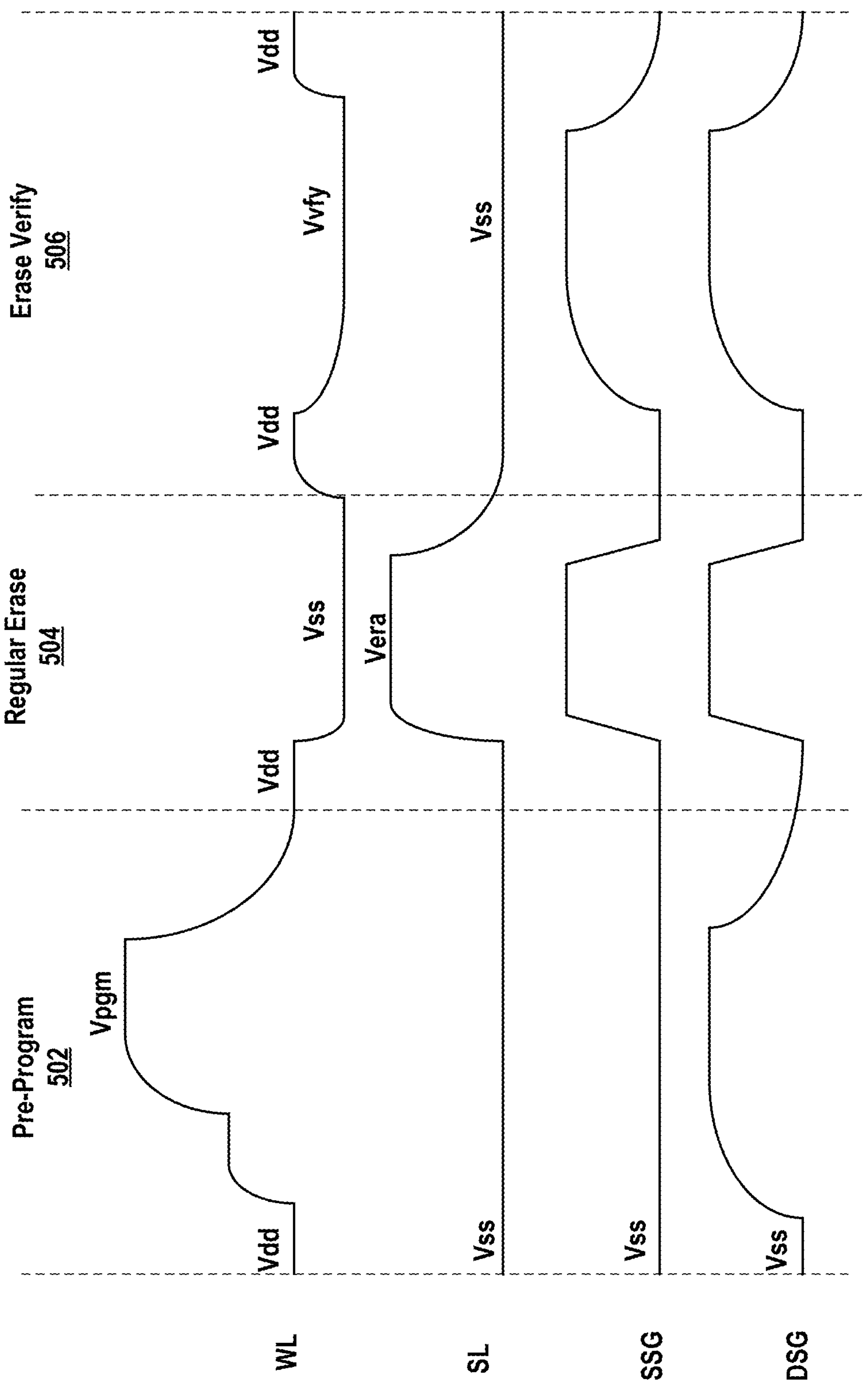
FIG. 5C illustrates timing diagrams of the erase operation shown in FIG. 5A.

FIG. 5A illustrates a flow chart of an erase operation 500. FIG. 5B illustrates the behavior of carriers in a charge trap layer during erase operation 500 shown in FIG. 5A. FIG. 5C illustrates timing diagrams of erase operation 500 shown in FIG. 5A. Erase operation 500 is triggered by receiving an erase command from a memory controller and is applied to a block of memory cells. As shown in FIG. 5A, erase operation 500 starts with a pre-program process 502, followed by a regular erase process 504. As shown in FIG. 5C, in pre-program process 502, a program voltage (Vpgm) is applied to each word line (WL) to program all the memory cells in the block. Supply voltages (Vss) are applied to the source line (SL), SSG line (SSG), and DSG line (DSG), respectively, in pre-program process 502. In regular erase process 504, a negative supply voltage (Vss) is applied to each word line, and an erase voltage (Vera), e.g., 20 volts, is applied to the source line to erase the block of memory cells. As shown in FIG. 5A, erase operation 500 also includes an erase verify process 506, following regular erase process 504, which verifies the result of regular erase process 504, i.e., whether the block of memory cells are set to the erased state (E0). If the result of regular erase process 504 passes the verification, i.e., the block of memory cells are set to the erased state and pass the verification, erase operation 500 is finished. Otherwise, erase operation 500 returns back to regular erase process 504 again. As shown in FIG. 5C, in erase verify process 506, a verify voltage (Vvfy) is applied to each word line, and a supply voltage (Vss) is applied to the source line to verify whether the threshold voltages (Vth) of the block of memory cells are set to the threshold voltage corresponding to the erased state (E0).

As shown in FIG. 5B, before regular erase process 504, at least some memory cells in the block are set to various programmed states (e.g., P3, P5, and P7). As a result, electrons with negative charges are trapped in the charge trap layer for those memory cells with various amounts corresponding to the various programmed states. After regular erase process 504, the block of memory cells are set to the erased state (E0), and holes with positive charges replace the electrons to be trapped in the charge trap layer for the memory cells in the block. As shown in FIG. 5B, some holes are shallow holes that have relatively low energy levels compared with normal holes. The shallow holes, however, can more easily escape from the charge trap layer compared with the normal holes, therefore causing the shift of the threshold voltages of the block of memory cells at the erased state (a.k.al., E0 loss), which is undesirable for erase operations.

Figure 6A:
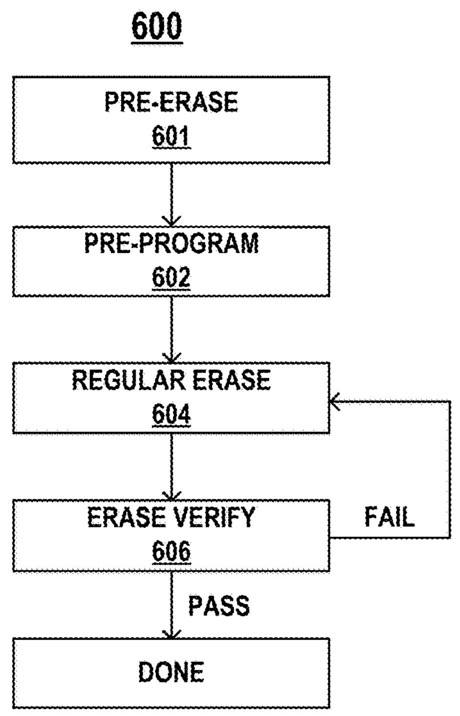
FIG. 6A illustrates a flow chart of an erase operation with a pre-erase scheme, according to some aspects of the present disclosure.
Figure 6B:
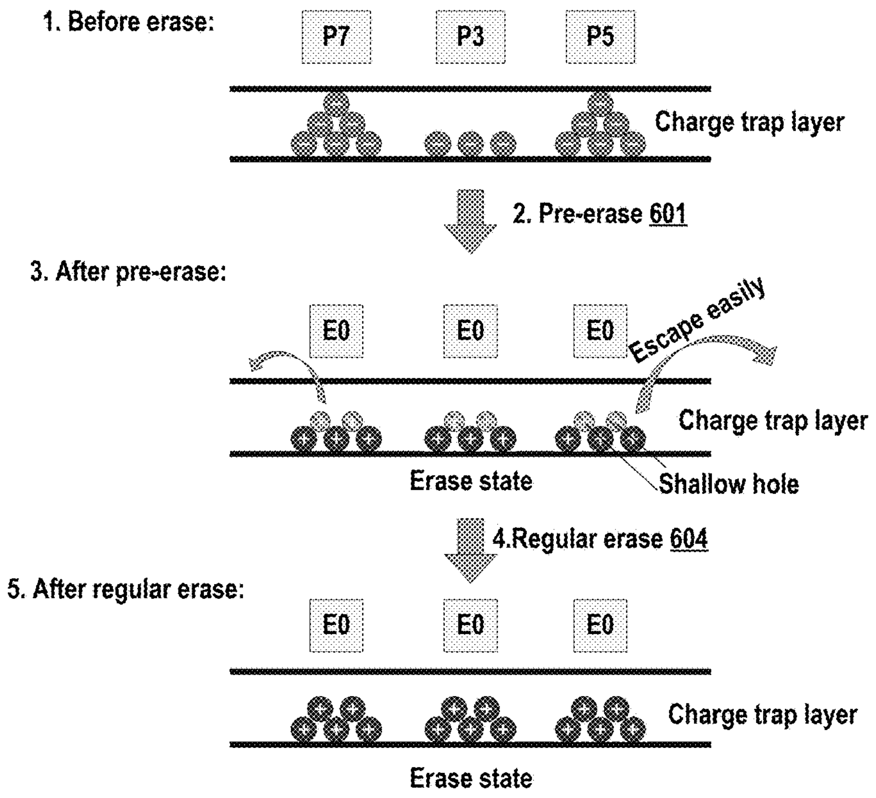
FIG. 6B illustrates the behavior of carriers in a charge trap layer during the erase operation shown in FIG. 6A, according to some aspects of the present disclosure.
Figure 6C:
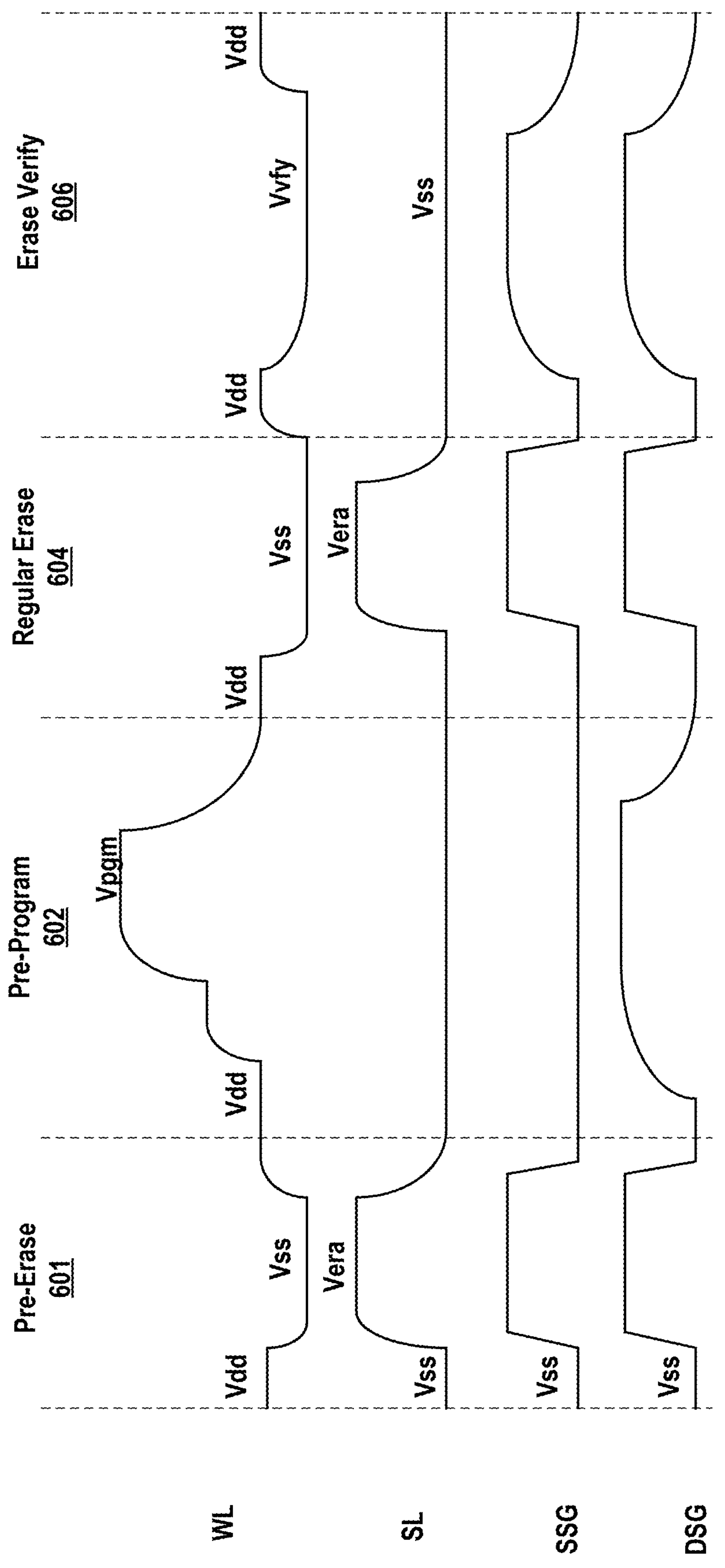
FIG. 6C illustrates timing diagrams of the erase operation shown in FIG. 6A, according to some aspects of the present disclosure.

Consistent with the scope of the present disclosure, erase operations with a pre-erase scheme are provided to mitigate E0 loss due to shallow holes as described below in detail. FIG. 6A illustrates a flow chart of an erase operation 600 with a pre-erase scheme, according to some aspects of the present disclosure. FIG. 6B illustrates the behavior of carriers in a charge trap layer during erase operation 600 shown in FIG. 6A, according to some aspects of the present disclosure. FIG. 6C illustrates timing diagrams of erase operation 600 shown in FIG. 6A, according to some aspects of the present disclosure. Erase operation 600 can be performed by peripheral circuit 102 on a block 104 of memory cells 106. In some implementations, erase operation 600 is triggered by receiving an erase command from a memory controller. In other words, all processes 601, 602, 604, and 606 shown in FIG. 6A are parts of erase operation 600, and the memory controller does not send separate commands to trigger each individual process 601, 602, 604, or 606, according to some implementations. It is understood that "operation" referred to herein may be triggered by a corresponding command from a memory controller, such as erase operation 600 triggered by an erase command, a program operation triggered by a program command, or a read operation triggered by a read command. In other words, a program operation and erase operation 600 may be basic functions performed by memory device 100 at the same level, while each process 601, 602, 604, or 606, including pre-program process 602, is part of erase operation 600.

As shown in FIG. 6A, different from erase operation 500, erase operation 600 can start with a pre-erase process 601 first. In pre-erase process 601, peripheral circuit 102 can be configured to pre-erase block 104 of memory cells 106. As shown in FIG. 6C, in some implementations, in pre-erase process 601, word line driver 308 of peripheral circuit 102 is configured to apply a supply voltage (Vss) to each word line 118 (WL). For example, the supply voltage may not be greater than 1 volt, such as a negative voltage, a ground voltage (0 volt), or a positive voltage between 0 volt and 1 volt. In some implementations, in pre-erase process 601, word line driver 308 of peripheral circuit 102 is also configured to apply an erase voltage, e.g., 20 volts, to source line 114 (SL), which is the common source line of entire block 104. In some implementations, in pre-erase process 601, word line driver 308 of peripheral circuit 102 is further configured to apply positive voltages to SSG line 115 and DSG line 113 to turn on SSG transistor 110 and DSG transistor 112, respectively.

As shown in FIG. 6A, erase operation 600 can include a pre-program process 602 after pre-erase process 601. In some implementations, pre-program process 602 is performed immediately after pre-erase process 601, for example, without an erase verify process that verifies the result of pre-erase process 601 in order to shorten the duration of erase operation 600. In pre-program process 602, peripheral circuit 102 can be configured to program block 104 of memory cells 106 to set each memory cell 106 to a programmed state. As shown in FIG. 6C, in some implementations, in pre-program process 602, word line driver 308 of peripheral circuit 102 is configured to apply a program voltage (Vpgm) to each word line 118. The program voltage can be determined based on the programmed state to which memory cells 106 in block 104 are to be set. In some implementations, in pre-program process 602, word line driver 308 of peripheral circuit 102 is also configured to apply supply voltages (Vss) to source line 114, SSG line 115, and DSG line 113, respectively. Pre-program process 602 can help to set all memory cells 106 in block 104 to a uniform threshold distribution before a regular erase process 604 to ensure the uniform erase of all memory cells 106 in block 104 by regular erase process 604.

As shown in FIG. 6A, erase operation 600 can also include regular erase process 604 after pre-program process 602. In some implementations, regular erase process 604 is performed immediately after pre-program process 602, for example, without a program verify process that verifies the result of pre-program process 602 in order to shorten the duration of erase operation 600. In some implementations, an erase verify process is not performed between pre-erase process 601 and regular erase process 604 in erase operation 600 to save the total erase time. In some implementations, peripheral circuit 102 is configured not to verify block 104 of memory cells 106 after pre-erase process 601 and before regular erase process 604. In regular erase process 604, peripheral circuit 102 can be configured to erase block 104 of memory cells 106. As shown in FIG. 6C, in some implementations, in regular erase process 604, word line driver 308 of peripheral circuit 102 is configured to apply a supply voltage (Vss) to each word line 118. For example, the supply voltage may not be greater than 1 volt, such as a negative voltage, a ground voltage (0 volt), or a positive voltage between 0 volt and 1 volt. The supply voltages used for pre-erase process 601 and regular erase process 604 may be the same in some examples to simplify the voltage generation and control. The supply voltages used for pre-erase process 601 and regular erase process 604 may be different in some examples to allow flexible control of different degrees of erase by pre-erase process 601 and regular erase process 604. In some implementations, in regular erase process 604, word line driver 308 of peripheral circuit 102 is also configured to apply an erase voltage (Vera), e.g., 20 volts, to source line 114. In some implementations, in regular erase process 604, word line driver 308 of peripheral circuit 102 is further configured to apply positive voltages to SSG line 115 and DSG line 113 to turn on SSG transistor 110 and DSG transistor 112, respectively.

As shown in FIG. 6A, erase operation 600 can further include an erase verify process 606 after regular erase process 604 to verify the result of regular erase process 604. In erase verify process 606, peripheral circuit 102 can be configured to verify block 104 of memory cells 106 after erasing block 104 of memory cells 106 by regular erase process 604. As shown in FIG. 6C, in some implementations, in erase verify process 606, word line driver 308 of peripheral circuit 102 is configured to apply a verify voltage (Vvfy) to each word line 118 to verify whether the threshold voltages of block 104 of memory cells 106 are set to the erased state. The verify voltage can be determined based on the threshold voltage distribution at the erased state. In some implementations, in erase verify process 606, word line driver 308 of peripheral circuit 102 is also configured to apply a supply voltage (Vss) to source line 114. In some implementations, in erase verify process 606, word line driver 308 of peripheral circuit 102 is further configured to apply positive voltages to SSG line 115 and DSG line 113 to turn on SSG transistor 110 and DSG transistor 112, respectively.

As shown in FIG. 6A, in response to block 104 of memory cells 106 after erasing by regular erase process 604 being successfully verified (the result of regular erase process 604 passes the verification, i.e., block 104 of memory cells 106 are set to the erased state and pass the verification), erase operation 600 can be finished. In response to block 104 of memory cells 106 after erasing by regular erase process 604 failing to be verified (the result of regular erase process 604 fails the verification, i.e., block 104 of memory cells 106 are not set to the erased state and fails the verification), erase operation 600 can return to regular erase process 604 again. As a result, peripheral circuit 102 can be configured to erase block 104 of memory cells 106 again and verify the result of regular erase process 604 again. That is, different from pre-erase process 601 without a following erase verify process, in erase operation 600, regular erase process 604, either the initial one or any repeated one, is always followed by erase verify process 606 to determine whether to finish erase operation 600 or perform another round of regular erase process 604/erase verify process 606, according to some implementation.

As shown in FIG. 6B, before pre-erase process 601, at least some memory cells 106 in block 104 may be set to various programmed states (e.g., P3, P5, and P7). As a result, electrons with negative charges can be trapped in the charge trap layer for those memory cells 106 with various amounts corresponding to the various programmed states. After pre-erase process 601, block 104 of memory cells 106 are set to the erased state (E0), and holes with positive charges can replace the electrons to be trapped in the charge trap layer for memory cells 106 in block 104. As shown in FIG. 6B, some shallow holes can escape from the charge trap layer at this stage before regular erase process 604. Pre-program process 602 that applies a positive program voltage to each word line 118 can also facilitate the shallow holes to escape from the charge trap layer. Also, some shallow holes can transition to higher energy levels, turning into normal holes, at this stage before regular erase process 604. That is, pre-erase process 601 can provide an opportunity and additional time for shallow holes to escape or transition into normal holes, thereby reducing the amount and ratio of shallow holes after regular erase process 604, as shown in FIG. 6B. Thus, the E0 loss issue can be addressed by pre-erase process 601.

Figure 7:
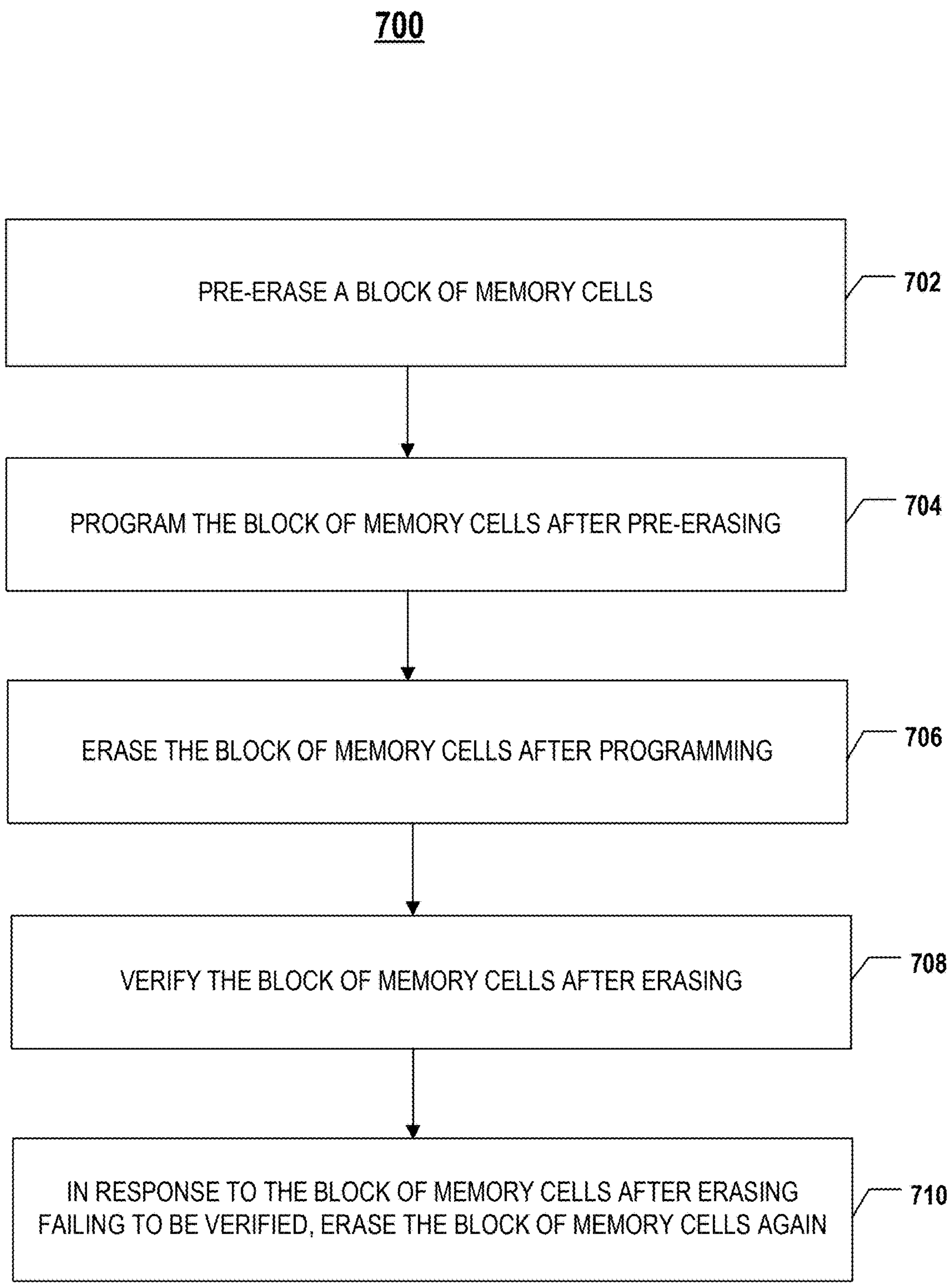
FIG. 7 illustrates a flowchart of a method for operating a memory device, according to some aspects of the present disclosure.

FIG. 7 illustrates a flowchart of a method 700 for operating a memory device, according to some aspects of the present disclosure. The memory device may be any suitable memory device disclosed herein, such as memory device 100. Method 700 may be implemented by peripheral circuit 102, such as row decoder/word line driver 308, page buffer/sense amplifier 304, and control logic 312. It is understood that the operations shown in method 700 may not be exhaustive and that other operations can be performed as well before, after, or between any of the illustrated operations. Further, some of the operations may be performed simultaneously, or in a different order than shown in FIG. 7.

Referring to FIG. 7, method 700 starts at operation 702, in which a block of memory cells are pre-erased in an erase operation. In some implementations, to pre-erase the block of memory cells, a supply voltage that is not greater than 1 volt is applied to each of word lines.

For example, in erase operation 600, peripheral circuit 102 may be configured to pre-erase block 104 of memory cells 106 in pre-erase process 601. Word line driver 308 of peripheral circuit 102 may be configured to apply the supply voltage (Vss) that is not greater than 1 volt to each word line 118, as shown in FIG. 6C, to pre-erase block 104 of memory cells 106 in pre-erase process 601.

Method 700 proceeds to operation 704, as illustrated in FIG. 7, in which the block of memory cells are programmed after pre-erasing the block of memory cells. In some implementations, the block of memory cells are programmed immediately after pre-erasing the block of memory cells. In some implementations, to program the block of memory cells, a program voltage is applied to each of the word lines.

For example, in erase operation 600, peripheral circuit 102 may be configured to program block 104 of memory cells 106 in pre-program process 602. Word line driver 308 of peripheral circuit 102 may be configured to apply the program voltage (Vpgm) to each word line 118, as shown in FIG. 6C, to program block 104 of memory cells 106 in pre-program process 602.

Method 700 proceeds to operation 706, as illustrated in FIG. 7, in which the block of memory cells are erased after programming the block of memory cells. In some implementations, the block of memory cells are erased immediately after programming the block of memory cells. In some implementations, the block of memory cells are not verified after pre-erasing and before erasing the block of memory cells. In some implementations, to erase the block of memory cells, the supply voltage is applied to each of the word lines.

For example, in erase operation 600, peripheral circuit 102 may be configured to erase block 104 of memory cells 106 in regular erase process 604. Word line driver 308 of peripheral circuit 102 may be configured to apply the supply voltage (Vss) to each word line 118, as shown in FIG. 6C, to erase block 104 of memory cells 106 in regular erase process 604.

Method 700 proceeds to operation 708, as illustrated in FIG. 7, in which the block of memory cells are verified after erasing the block of memory cells. For example, in erase operation 600, peripheral circuit 102 may be configured to verify block 104 of memory cells 106 in erase verify process 606. Word line driver 308 of peripheral circuit 102 may be configured to apply the verify voltage (Vvfy) to each word line 118, as shown in FIG. 6C, to verify block 104 of memory cells 106 in erase verify process 606.

Method 700 proceeds to operation 710, as illustrated in FIG. 7, in which, in response to the block of memory cells after erasing failing to be verified, the block of memory cells are erased again. For example, in erase operation 600, in response to block 104 of memory cells 106 after erasing failing to be verified, peripheral circuit 102 may be configured to erase block 104 of memory cells 106 in regular erase process 604 again. Word line driver 308 of peripheral circuit 102 may be configured to apply the supply voltage (Vss) to each word line 118 to erase block 104 of memory cells 106 again in another regular erase process 604.

Figure 8:
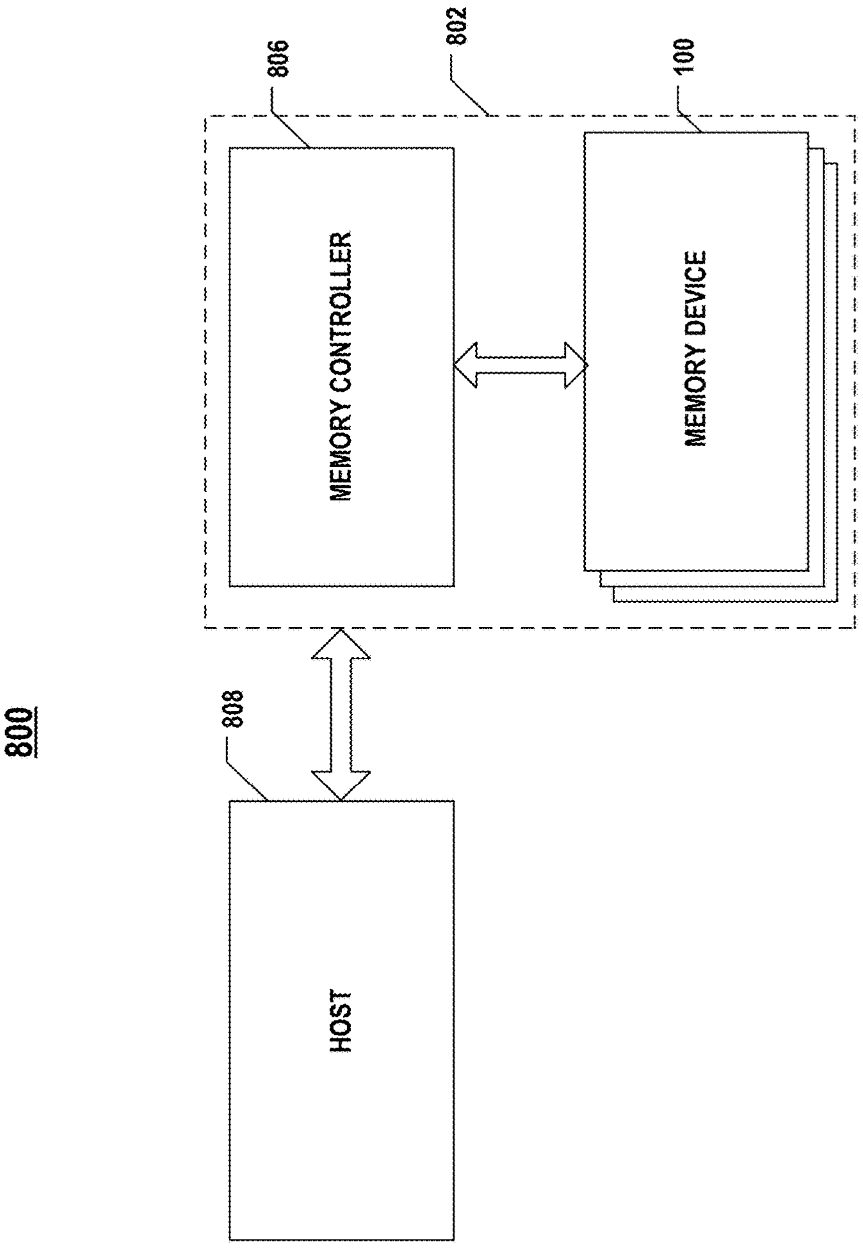
FIG. 8 illustrates a block diagram of a system having a memory device, according to some aspects of the present disclosure.

FIG. 8 illustrates a block diagram of a system 800 having a memory device, according to some aspects of the present disclosure. System 800 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 8, system 800 can include a host 808 and a memory system 802 having one or more memory devices 100 (shown in FIG. 1) and a memory controller 806. Host 808 can be a processor of an electronic device, such as a central processing unit (CPU), or a system-on-chip (SoC), such as an application processor (AP). Host 808 can be configured to send or receive data to or from memory devices 100.

Memory device 100 can be any memory device disclosed in the present disclosure. Memory controller 806 is coupled to memory device 100 and host 808 and is configured to control memory device 100, according to some implementations. Memory controller 806 can manage the data stored in memory device 100 and communicate with host 808. In some implementations, memory controller 806 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 806 is designed for operating in a high duty-cycle environment SSDs or embedded multi-media-cards (eMMCs) used as data storage for mobile devices, such as smartphones, tablets, laptop computers, etc., and enterprise storage arrays. Memory controller 806 can be configured to control operations of memory device 100, such as read, erase, and program operations. Memory controller 806 can also be configured to manage various functions with respect to the data stored or to be stored in memory device 100 including, but not limited to bad-block management, garbage collection, logical-to-physical address conversion, wear leveling, etc. In some implementations, memory controller 806 is further configured to process error correction codes (ECCs) with respect to the data read from or written to memory device 100. Any other suitable functions may be performed by memory controller 806 as well, for example, formatting memory device 100. Memory controller 806 can communicate with an external device (e.g., host 808) according to a particular communication protocol. For example, memory controller 806 may communicate with the external device through at least one of various interface protocols, such as a USB protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Consistent with the scope of the present disclosure, memory controller 806 can be configured to transmit erase commands to memory device 100 to control memory device 100 to perform the erase operations with pre-erase described herein. In some implementations, memory controller 806 is configured to send an erase command to peripheral circuit 102 of memory device 100 to cause peripheral circuit 102 of memory device 100 to pre-erase, program, and erase a block 104 of memory cells 106 in response to receiving the erase command, as described above in detail. In other words, pre-erase process 601, pre-program process 602, regular erase process 604, and erase verify process 606 performed by memory device 100 are parts of erase operation 600 triggered by a corresponding erase command sent from memory controller 806, according to some implementations.

Figure 9A:
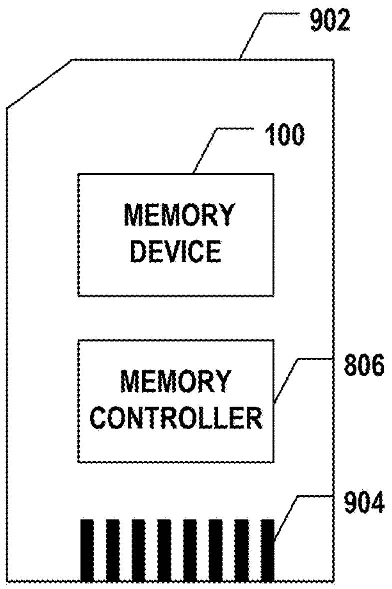
FIG. 9A illustrates a diagram of a memory card having a memory device, according to some aspects of the present disclosure.
Figure 9B:
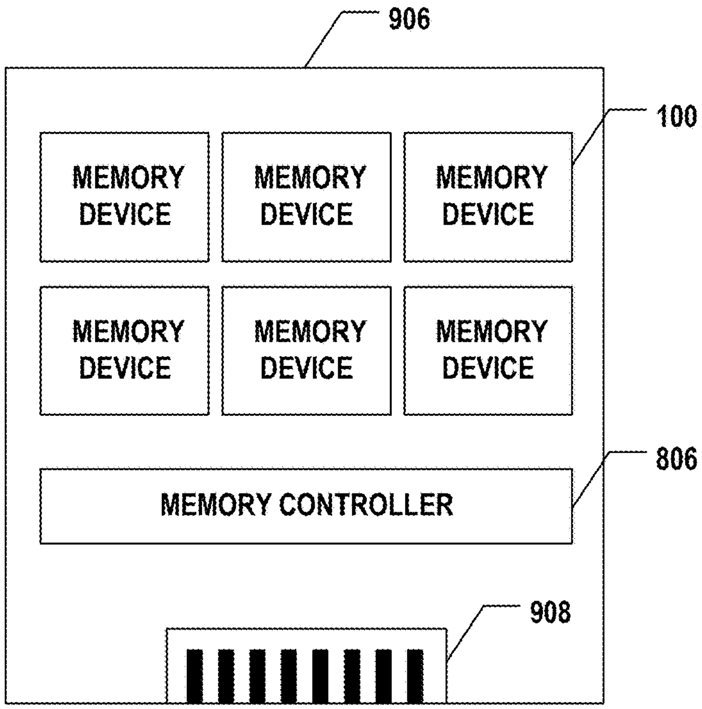
FIG. 9B illustrates a diagram of a solid-state drive (SSD) having a memory device, according to some aspects of the present disclosure.

Memory controller 806 and one or more memory devices 100 can be integrated into various types of storage devices, for example, being included in the same package, such as a universal Flash storage (UFS) package or an eMMC package. That is, memory system 802 can be implemented and packaged into different types of end electronic products. In one example as shown in FIG. 9A, memory controller 806 and a single memory device 100 may be integrated into a memory card 902. Memory card 902 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 902 can further include a memory card connector 904 coupling memory card 902 with a host (e.g., host 808 in FIG. 8). In another example as shown in FIG. 9B, memory controller 806 and multiple memory devices 100 may be integrated into an SSD 906. SSD 906 can further include an SSD connector 908 coupling SSD 906 with a host (e.g., host 808 in FIG. 8). In some implementations, the storage capacity and/or the operation speed of SSD 906 is greater than those of memory card 902.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

Although specific configurations and arrangements are discussed, it should be understood that this is done for illustrative purposes only. As such, other configurations and arrangements can be used without departing from the scope of the present disclosure. Also, the subject matter as described in the present disclosure can also be used in a variety of other applications. Functional and structural features as described in the present disclosures can be combined, adjusted, modified, and rearranged with one another and in ways that are consistent with the scope of the present disclosure.

What is claimed is:

1. A memory device, comprising:
a block of memory cells; and
a peripheral circuit coupled to the block of memory cells and configured to, in an erase operation:
pre-erase the block of memory cells;
program the block of memory cells after pre-erasing the block of memory cells and prior to performing any verification of the block of memory cells in the erase operation; and
erase the block of memory cells after programming the block of memory cells.

2. The memory device of claim 1, wherein the peripheral circuit is configured to program the block of memory cells immediately after pre-erasing the block of memory cells, and erase the block of memory cells immediately after programming the block of memory cells.

3. The memory device of claim 1, wherein the peripheral circuit is further configured to verify the block of memory cells after erasing the block of memory cells.

4. The memory device of claim 3, wherein the peripheral circuit is further configured to, in response to the block of memory cells failing to be verified after erasing, erase the block of memory cells again.

5. The memory device of claim 1, wherein
the memory device further comprises word lines respectively coupled to rows of the block of memory cells;
to pre-erase the block of memory cells, the peripheral circuit is configured to apply a supply voltage that is not greater than 1 volt to each of the word lines; and
to erase the block of memory cells, the peripheral circuit is configured to apply the supply voltage to each of the word lines.

6. The memory device of claim 5, wherein to program the block of memory cells, the peripheral circuit is configured to apply a program voltage to each of the word lines.

7. The memory device of claim 1, wherein the memory device is a NAND Flash memory device.

8. A method for operating a memory device comprising a block of memory cells, the method comprising, in an erase operation:
pre-erasing the block of memory cells;
programming the block of memory cells after pre-erasing the block of memory cells and prior to performing any verification of the block of memory cells in the erase operation; and
erasing the block of memory cells after programming the block of memory cells.

9. The method of claim 8, further comprising programming the block of memory cells immediately after pre-erasing the block of memory cells, and erasing the block of memory cells immediately after programming the block of memory cells.

10. The method of claim 8, further comprising verifying the block of memory cells after erasing the block of memory cells.

11. The method of claim 10, further comprising, in response to the block of memory cells failing to be verified after erasing, erasing the block of memory cells again.

12. The method of claim 8, wherein
the memory device further comprises word lines respectively coupled to rows of the block of memory cells;
pre-erasing the block of memory cells comprises applying a supply voltage that is not greater than 1 volt to each of the word lines; and
erasing the block of memory cells comprises applying the supply voltage to each of the word lines.

13. The method of claim 12, wherein programming the block of memory cells comprises applying a program voltage to each of the word lines.

14. A system, comprising:
a memory device configured to store data, the memory device comprising:
a block of memory cells; and
a peripheral circuit coupled to the block of memory cells and configured to, in an erase operation:
pre-erase the block of memory cells;

program the block of memory cells after pre-erasing the block of memory cells and prior to performing any verification of the block of memory cells in the erase operation; and erase the block of memory cells after programming the block of memory cells; and a memory controller coupled to the memory device and configured to control the memory device.

15. The system of claim 14, wherein the memory controller is configured to send an erase command to the peripheral circuit of the memory device; and the peripheral circuit is configured to pre-erase, program, and erase the block of memory cells in response to receiving the erase command.

16. The system of claim 14, wherein the peripheral circuit is configured not to verify the block of memory cells after pre-erasing and before erasing the block of memory cells.

17. The system of claim 14, wherein the peripheral circuit is configured to program the block of memory cells immediately after pre-erasing the block of memory cells, and erase the block of memory cells immediately after programming the block of memory cells.

18. The system of claim 14, wherein the peripheral circuit is further configured to verify the block of memory cells after erasing the block of memory cells.

19. The system of claim 18, wherein the peripheral circuit is further configured to, in response to the block of memory cells failing to be verified after erasing, erase the block of memory cells again.

20. The system of claim 14, wherein the memory device further comprises word lines respectively coupled to rows of the block of memory cells;

to pre-erase the block of memory cells, the peripheral circuit is configured to apply a supply voltage that is not greater than 1 volt to each of the word lines; and to erase the block of memory cells, the peripheral circuit is configured to apply the supply voltage to each of the word lines.

* * * * *